United States Patent
Gopal et al.

(10) Patent No.: US 7,926,033 B2
(45) Date of Patent: Apr. 12, 2011

(54) METHOD FOR SUPPORTING NEW NETWORK ELEMENT SOFTWARE VERSIONS IN AN ELEMENT MANAGEMENT SYSTEM WITHOUT UPGRADING

(75) Inventors: Niraj Gopal, San Jose, CA (US); Jiong Sun, Fremont, CA (US); Sai V. Ramamoorthy, Sunnyvale, CA (US); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 1109 days.

(21) Appl. No.: 11/139,065

(22) Filed: May 27, 2005

(65) Prior Publication Data

US 2006/0271914 A1 Nov. 30, 2006

(51) Int. Cl.
*G06F 9/44* (2006.01)
*G06F 9/445* (2006.01)
*G06F 15/177* (2006.01)
*G06F 15/173* (2006.01)

(52) U.S. Cl. ........ 717/122; 717/173; 717/178; 709/220; 709/223

(58) Field of Classification Search .................. None
See application file for complete search history.

(56) References Cited

U.S. PATENT DOCUMENTS

| | | | |
|---|---|---|---|
| 5,909,689 A * | 6/1999 | Van Ryzin | 707/203 |
| 6,230,194 B1 * | 5/2001 | Frailong et al. | 709/220 |
| 6,884,172 B1 * | 4/2005 | Lloyd et al. | 463/42 |
| 6,963,908 B1 * | 11/2005 | Lynch et al. | 709/220 |
| 7,213,065 B2 * | 5/2007 | Watt | 709/223 |
| 2005/0246687 A1 * | 11/2005 | Scott | 717/122 |

* cited by examiner

*Primary Examiner* — Michael J Yigdall
*Assistant Examiner* — Evral Bodden
(74) *Attorney, Agent, or Firm* — Hickman Palermo Truong & Becker LLP

(57) ABSTRACT

A method and apparatus for configuring an element management system server (an EMS server) to support new network element service application versions without upgrading the EMS server software is provided. The EMS stores base version data that describes the data model of a first version of a service application installed on a network element. When a second version of the service application is available, incremental version data describing changes to the data model from the first version to the second version is obtained and stored. In response to receiving a client request involving a service application on a particular network element, the EMS may apply incremental version data, associated with the version of the service application installed on the particular network element, to the base version data to form merged version data that describes the data model of the version of the service application installed on the particular network element.

18 Claims, 4 Drawing Sheets

METHOD FOR SUPPORTING NEW NETWORK ELEMENT SOFTWARE VERSIONS IN AN ELEMENT MANAGEMENT SYSTEM WITHOUT UPGRADING

FIELD OF THE INVENTION

The present invention relates to enabling an element management system (EMS) to support new network element software versions without upgrading the software of the EMS server.

BACKGROUND

An element management system server (an EMS server) is a server that is responsible for administering one or more services on one or more network elements. Each network element (NE) administered by an EMS server is typically the same type of NE, such as a router or switch in a packet-switched network. Some EMS servers have the capability of managing multiple types of NEs from a single vendor or manufacturer. An administrator may use an element management system client (an EMS client) to communicate with the EMS server. The EMS client provides an interface that allows an administrator to manage and configure the services being provisioned by the EMS server on a particular NE.

A service being administered by an EMS server is typically provided by a service application. An EMS server typically provisions multiple services on any given NE being administered by the EMS server. As a result, most NEs execute multiple service support applications.

For each service application that the software being executed by an EMS server (the EMS server software) supports, the EMS server software supports a particular set of versions of the service application. For example, an illustrative EMS server may execute EMS server software that supports version 1.0 of service application A, version 2.0 of service application B, and versions 1.0, 2.0, and 2.2 of service application C.

To illustrate, assume that an administrator wishes to configure how a particular service, such as Voice Over IP (VoIP), is being provisioned on router XYZ. The EMS server software supports version 2.0 of the service application providing the VoIP service ("the VoIP service application"), and router XYZ also executes version 2.0 of the VoIP service application. The administrator may use an EMS client, hosted on the administrator's workstation, to communicate with the EMS server. After configuring how the EMS server provisions the VoIP service, the administrator may deploy the VoIP service, as configured, on router XYZ by sending instructions from the EMS client to the EMS server to cause the EMS server to provision the VoIP service, as configured, on router XYZ.

From time to time, new versions of a service application may become available. When a new version of a service application becomes available, to enable the EMS server to provision a service using the new version of the service application, a new version of the EMS server software that supports the new version of the service application must be installed on the EMS server. This is so because an EMS server may not provision a service on a particular NE that is executing a version of a service application that the EMS server does not support.

However, upgrading the EMS server software requires a certain amount of time, money, and resources. For example, before installing a new version of the EMS server software, the existing version of the EMS server software may need to be uninstalled. Also, the EMS server may need to be taken offline, and therefore be unavailable, when the EMS server software is being upgraded. As a result, all the services being provisioned by the EMS server may be unavailable during the time the EMS server software is being upgraded. Thus, the fundamental problem is how to enable a management system to manage NE's when services on the NE's change over time, without reinstalling the management system.

To minimize both the amount of time that an EMS server is unavailable and the inconvenience to the operator of the EMS server, it is typical to wait a length of time before upgrading the EMS server software so that new versions of multiple service applications may be reflected in the newly installed EMS server software. For example, every six months, the manufacturer of the EMS server may make available a new version of the EMS server software that reflects any new version of service applications that became available since the last available release of the EMS server software. Unfortunately, this approach naturally delays the amount of time before which the EMS server may provision services using a newly available version of a service applications.

Therefore, it would be advantageous to allow an EMS server to support new versions of service applications without performing a full upgrade of the EMS server software.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Functional Overview

Embodiments of the invention enable an element management system server (an EMS server) to support new versions of a service application without upgrading the EMS server software. In this way, when a new version of a service application becomes available, the EMS server may be updated to support the new version of the service application without performing a full upgrade of the EMS server software. Additionally, an EMS server may be updated, without performing a full upgrade of the EMS server software, to support older versions of service applications that the EMS server did not previously support.

An EMS server may not be able to properly provision a service on a particular network element using a service application if the way the EMS server represents data for the service application differs from the way that the network element represents data for the service application. Certain embodiments operate under the recognition that, if an EMS server already supports a first version of a service application, then the EMS server can support a second version of the service application by storing data that describes changes to a data model used by the service application from the first version to the second version. In this way, the EMS server can construct the data model used by the second version of the service application by correlating the data model of the first version with information about the changes to the data model from the first version to the second version. After the EMS server constructs the data model used by the second version of the service application, the EMS server may provision a service on any network element, which is executing the second version of a service application, using the constructed data model of the second version of the service application.

Figure 1:
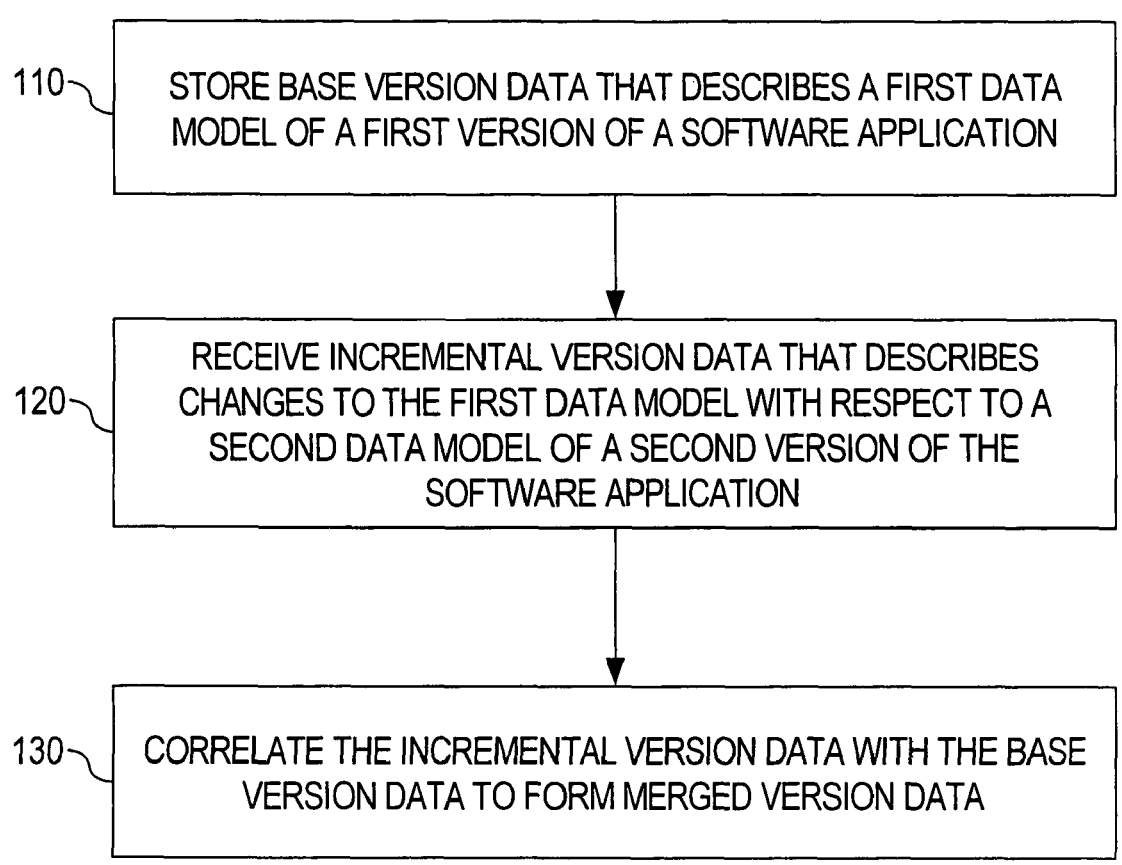
FIG. 1 is a flowchart of the high level steps of configuring a device according to an embodiment.

FIG. 1 is a flowchart of the high level steps of configuring a device, such as an EMS server, according to an embodiment of the invention. In step 110, base version data is stored that describes a first data model of a first version of a software application. For example, in step 110, an EMS server may store base version data that describes a data model of version 2.0 of a service application used to provision a VoIP service on network elements by the EMS server. The service application is hosted on one or more network elements.

In step 120, incremental version data that describes changes to the first data model with respect to a second data model of a second version of the service application is received. For example, in step 120, the EMS server may receive incremental version data that describes changes made to the data model of the service application between version 2.0 and version 3.0.

The second version of the service application need not be a subsequent version of the software application; the second version may be an earlier version or any other different version. For example, in step 120, the EMS server may receive incremental version data that describes changes made to the data model of the service application between version 1.0 and version 2.0.

In step 130, the incremental version data and the base version data are correlated to form merged version data. The merged version data allows the EMS server to provision a service on a network element that is executing a service application having the same version that was associated with the incremental version data. For example, assuming, in step 120, that the EMS server received incremental version data that describes the changes made to a data model from a first version of a service application to version 3.0 of the service application, then in step 130, the EMS server may use the merged version data, that was formed in step 130, to provision a service to any network element executing version 3.0 of the service application.

In an embodiment, an EMS server may store multiple sets of merged version data. In this way, the EMS server may support any version of a service application for which the EMS server is storing either base version data or merged version data. For example, an illustration EMS server may store (a) base version data for version 2.0 of service application ABC, and (b) merged version data for versions 1.0, 1.2, and 3.0 of service application ABC. Thus, the EMS server can provision a service on any network element that is executing versions 1.0, 1.2, 2.0, or 3.0 of service application ABC.

Architecture Overview

Figure 2:
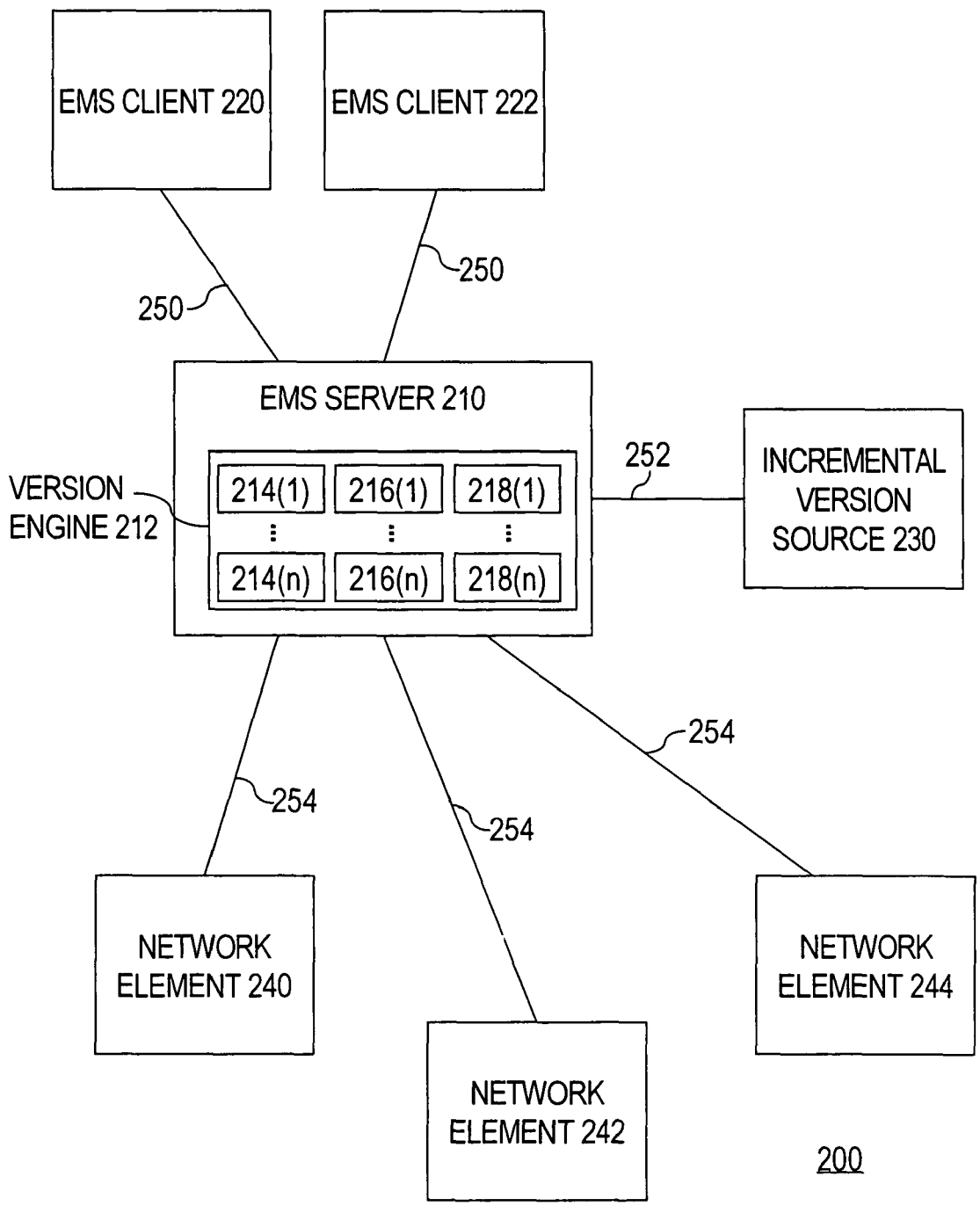
FIG. 2 is a block diagram of an illustrative system according to an embodiment.

FIG. 2 is a block diagram of an illustrative system 200 according to an embodiment. System 200 may be used to enable an EMS server to support new versions of a service application without upgrading the EMS server software. In an embodiment, system 200 comprises an EMS server, an EMS client, an incremental version source, a network element, and one or more communications links.

EMS server 210 may be implemented using any functional component that is capable of provisioning a service on a network element. An illustrative, non-limiting example of EMS server 210 is the Cisco Transport Manager (CTM), available from Cisco Systems, Inc. of San Jose, Calif.

In an embodiment, EMS server 210 includes a version engine 212, base version data 214, one or more sets of incremental version data 216, and one or more sets of merged version data 218. A version engine 212, as broadly used herein, refers to any functional component capable of performing the steps illustrated in FIG. 1. In an embodiment, version engine 212 may be implemented as a software module executing on the EMS server 210.

Base version data 214 refers to data that describes a first data model of a first version of a software application managed by the EMS server 210. Incremental version data 216 refers to data that describes changes to the first data model associated with base version data 214 with respect to a second data model of a second version of the software application. Merged version data 218 is data that describes the second data model. Base version data 214, incremental version data 216, and merged version data 218 may be stored at a location at or accessible to the EMS server 210. The creation and use of base version data 214, incremental version data 216, and merged version data 218 shall be discussed in further detail below.

EMS client 220 and EMS client 222 may each be implemented using any functional component that is capable of communicating with an EMS server to allow an administrator to manage and configure the services being provisioned by the EMS server on a particular network element. A non-limiting, illustrative example of an EMS client is the NE Explorer application, available from Cisco Systems, Incorporated of San Jose, Calif.

An incremental version source, such as incremental version source 230, as broadly used herein represents any potential source for incremental version data 216. EMS server 210 may retrieve incremental version data 216 from incremental version source 230 over communications link 252. A provider of a particular service application may periodically make available incremental version data 216 for the particular service application. Non-limiting, illustrative examples of incremental version source 230 include a website affiliated with the provider of the service application or the EMS server 210 (for example, the Cisco Connection Online website, which is a website well known to customers of Cisco Systems, Inc. as a source for obtaining information and downloadable files).

A network element (NE), such as network element 240, 242, and 244, as broadly used herein, refers to any functional component upon which an EMS server may provision a service. A NE may include any network infrastructure device, such as a router, switch, etc. A non-limiting, illustrative example of a network element is the CRS-1 router, available from Cisco Systems, Inc. of San Jose, Calif.

Communications link 250 may be implemented by any medium or mechanism that provides for the exchange of data between an EMS client and an EMS server. Communications link 252 may be implemented by any medium or mechanism over which the EMS server may retrieve incremental version data. Communications link 254 may be implemented by any medium or mechanism that provides for the exchange of data between an EMS server and a network element. Examples of communications links 250, 252, and 254 include, without limitation, a network such as a Local Area Network (LAN), Wide Area Network (WAN), Ethernet or the Internet, or one or more terrestrial, satellite or wireless links.

For ease of explanation, only one incremental version source, two EMS clients and three network elements are depicted in FIG. 2. However, system 200 may include any number of incremental version sources, any number of EMS clients, and any number of network elements. Consequently, embodiments are not limited to the number of incremental version sources, EMS clients, or network elements within system 200.

Having described the architecture of an illustrative, the process of configuring EMS server 210 using incremental version data 216 shall be described below according to an embodiment.

Configuring a Device Using Incremental Version Data

Figure 3:
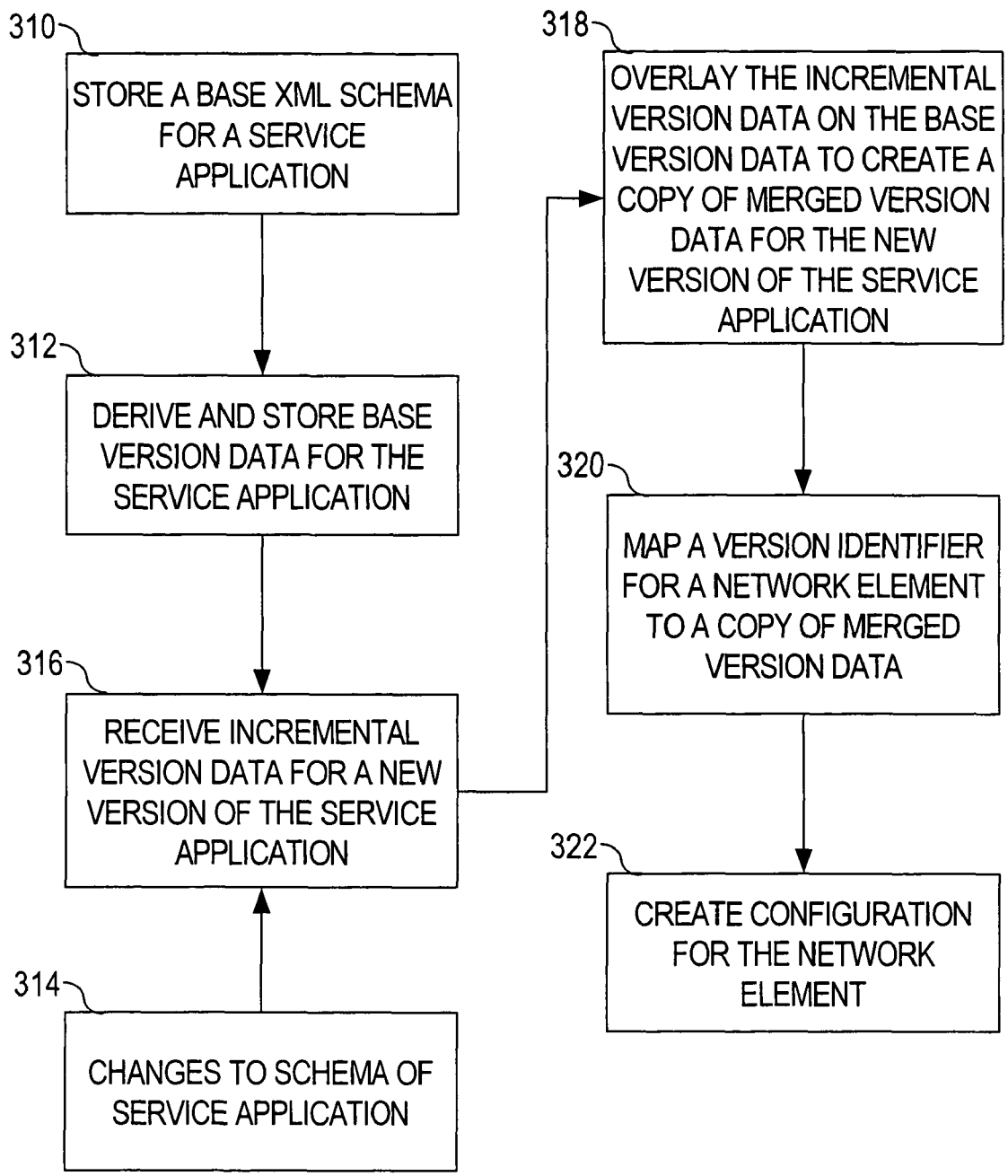
FIG. 3 is a flowchart illustrating the steps of enabling an EMS server to support new versions of a service application without upgrading the EMS server software according to an embodiment.

FIG. 3 is a flowchart illustrating the steps of enabling an EMS server to support new versions of a service application without upgrading the EMS server software according to an embodiment of the invention. For ease of explanation, while base version data 214, incremental version data 216, and merged version data 218 may be stored for two or more service applications, the performance of the steps of FIG. 3 are explained below with respect to receiving a single set of incremental version data 216 for a single service application and creating a single set of merged version data 218. However, the steps of FIG. 3 may be repeated to store additional sets of base version data 214, incremental version data 216, and merged version data 218 for two or more service applications or two or more versions of a service application. In an embodiment, the steps of FIG. 3 may each be performed by version engine 212 of EMS server 210.

In step 310, EMS server 210 stores a base XML schema for a service application. A base XML schema is a schema, expressed in an XML format, that defines or models how the service application represents data. The base XML schema provides information about a version of a service application to the EMS server 210 to enable the EMS server 210 to provision a service on a network element using the version of the service application associated with the base XML schema.

For example, step 310 may be performed by EMS server 210 installing a set of software ("EMS server software") that (a) supports the operation of the EMS server 210, and (b) provides the EMS server 210 with the capability of provisioning one or more versions of one or more service application. The EMS server software contains a XML schema for each version of a service application that the EMS server software provides to the EMS server 210 the capability of provisioning.

To illustrate, if the EMS server 210 is installed with EMS server software that supports version 1.0 of service application ABC, then the EMS server software may comprise a base XML schema for version 1.0 of service application ABC.

As a specific example, EMS server 210 may be deployed in the field. EMS server 210 may be installed with EMS server software that comprises a data definition for a BGP application, an ISIS application, and a MPLS application. These data definitions are based on a version of the service application, typically the most recent version available at the time of the release of the EMS server 210. These data definition files may be auto-generated by running a script against a set of publicly available XML schemas for that image version. These data definition files store information to enable the EMS server 210 to dynamically determine, at runtime, the compatibility between the EMS server 210 and a particular service application.

After a base XML schema for a service application is stored by the EMS server 210, processing proceeds to step 312.

In step 312, EMS server 210 derives and stores base version data 114 for the service application. Base version data 114 is data that describes a data model of a version of a software application. Base version data 114 may be implemented using any format that describes a data model of a version of a software application.

In an embodiment, version engine 212 may derive the base version data 114 from the base XML schema stored in step 310. Base version data 114 may be stored in a location at or accessible to EMS server 210.

For illustration purposes, a sample portion of base version data 114 is provided below in Example 1.

Example 1

```
<?xml version="1.0" encoding="UTF-8"?>
  <Component Name="IFCOMMON" ComponentVersionID="1">
      <VersionInfo>
         <VersionedClass>
            XPath="/InterfaceAllConfiguration"
            MajorVersion="1"
            MinorVersion="3"
         </VersionedClass>
      </VersionInfo>
   <Record
     Name="IFGeneralRecord"
     DBTableName="HFR_COMMON_INTERFACE_CONFIG"
     CommonPath="/InterfaceAllConfiguration/InterfaceConfiguration"
     Type="Vector">
      <Property Name="InterfaceName"
         DBColumnName="IFID"
         XPath="/InterfaceAllConfiguration/InterfaceConfiguration/
         Naming/name"
         RelativePath="/Naming/name"
         Type="String"
         DisplayName="InterfaceName"
         Key="true"
         Required="true"
         Visible="true"
         Serializable="true"/>
      <Property Name="IPMTU"
         DBColumnName="IFMTU"
         XPath="/InterfaceAllConfiguration/InterfaceConfiguration/
         IPV4/MTU"
         Type="UnsignedInt"
         RelativePath="IPV4IOInterface/MTU"
         DisplayName="MTU (Layer 3)"
         Required="false"
         MinValue="68"
         MaxValue="65535"
         Visible="true"
         Serializable="true"/>
```

-continued

```
    <Property
        Name="NewField"
        DBColumnName="NEWFIELD"
        XPath="/InterfaceAllConfiguration/InterfaceConfiguration /
        NewField"
        RelativePath="NewField"
        Type=UnsignedInt32
        DisplayName="NewField"
        Required="true"
        Serializable="true"/>
    </Record>
</Component>
```

As shown above in Example 1, in an embodiment, base version data 214 may be expressed using the XML syntax. After the EMS server 210 derives and stores base version data 114 for the service application, processing proceeds to step 314.

In step 314, changes are made to the schema of the service application. Step 314 may be accomplished by a new version of a service application being made available. For example, if the base version data 214 that was derived and stored in step 312 is associated with version 2.0 of a service application, then step 314 may be performed by a version 2.2 or version 3.0 of the service application being made available.

However, step 314 need not involve a full, new version of the service application, as step 314 may be accomplished by performing any change, large or small, to the data model identified by the base version data 214. For example, the provider or manufacturer of the service application may make available a small patch to address a bug in the service application, and the small patch may make a change to the data model of the service application. Thus, step 314 is broadly represents any change to data model of the version of service application represented by the base version data 214. After the performance of step 314, processing proceeds to step 316.

In step 316, incremental version data for a new version of the service application is received. Incremental version data 216 is data that describes changes to the first data model with respect to a second data model of a second version of the software application.

As an example, steps 314-316 may involve the following: A new version of a service application is released. The new version of the service application has a data model that has changed from a prior version of the service application. A script is run against (a) the publicly available XML schemas for the new version of the service application and (b) the publicly available XML schemas for the version of the service application associated with the base version data 214, to generate the incremental version data 216 for the new version of the service application. The incremental version data 216 may be specified using an extensible meta-language, such as XML, using tags or mnemonics to indicate the type of changes that have been made to the schemas or data model. The following types of changes are supported to the schema or data model: (a) the addition of new attributes, (b) the deletion of existing attributes, and (c) modification of attributes, e.g., type change, range change, etc. Incremental version data 216 may be shipped to a customer site and copied to an appropriate location based on the install location of the EMS server 210. Alternately, incremental version data 216 may be made available on a public website and/or automatically installed at the appropriate location in the EMS server 210.

In an embodiment, in step 316, incremental version data 216 is obtained from incremental version source 230 over communications link 252. In an embodiment, the version engine 212 may be configured to check incremental version source 230 to determine if incremental version data 216 is available. For example, the version engine 212 may be configured to check, after the expiration of a specific interval or at a specified time, a public website, such as the Cisco Connection Online website. If the version engine 212 determines that incremental version data 216 is available from the incremental version source 230, then the version engine 212 may be configured to either notify an administrator (to allow the administrator to obtain the incremental version data 216) or automatically download the incremental version data 216 without further user intervention.

In other embodiments, the administrator of EMS server 210 may check the incremental version source 230, and if incremental version data 216 is available, download the incremental version data 216 to the EMS server 210.

For illustration purposes, a sample portion of incremental version data 216 is provided below in Example 2.

Example 2

```
<?xml version="1.0" encoding="UTF-8"?>
<Component Name="IFCOMMON" ComponentVersionID="0">
    <VersionInfo>
        <VersionedClass>
            XPath="/InterfaceAllConfiguration"
            DeltaType ="Change"
            MajorVersion="1"
            MinorVersion="0"
        </VersionedClass>
    </VersionInfo>
    <Record Name="IFGeneralRecord"
        CommonPath="/InterfaceAllConfiguration/InterfaceConfiguration"
        Type="Vector">
        <Property
            Name="IPMTU"
            DeltaType ="Change"
            XPath="/InterfaceAllConfiguration/InterfaceConfiguration/
            MTU"
            RelativePath="MTU" />
        <Property
            Name="OldField"
            DeltaType="Add"
            DBColumnName="OLDFIELD"
            XPath="/InterfaceAllConfiguration/InterfaceConfiguration/
            OldField"
            RelativePath="OldField"
            Type=UnsignedInt32
            DisplayName="OldField"
            Required="true"
            Serializable="true"/>
        <Property
            Name="NewField"
            DeltaType ="Delete" />
    </Record>
</Component>
```

As shown above in Example 2, in an embodiment, incremental version data 216 may be expressed using the XML protocol.

The incremental version data 216 obtained in step 316 may correspond to a version of the service application that reflects the changes made to the schema in step 314. However, the incremental version data 216 obtained in step 316 need not reflect the changes to the schema made in step 314, as incremental version data 216 may also correspond to an earlier version of the service application that the version associated with the base version data 214. After incremental version data 216 for a new version of the service application is received, processing proceeds to step 318.

In step 318, the incremental version data 216 is overlaid on the base version data 214 to create merged version data 218 for the new version of the service application. In an embodiment, the incremental version data 216 may be overlaid on the base version data 214 using the XML tags of the incremental version data 216 and the base version data 214.

To illustrate, the base version data 214 of Example 1 includes the following XML tags and associated data:

```
<VersionedClass>
    XPath="/InterfaceAllConfiguration"
    MajorVersion="1"
    MinorVersion="3"
</VersionedClass>
```

The incremental version data 216 of Example 2 includes the following XML tags and associated data:

```
<VersionedClass>
    XPath="/InterfaceAllConfiguration"
    DeltaType ="Change"
    MajorVersion="1"
    MinorVersion="0"
</VersionedClass>
```

The above XML tags illustrate that the base version data 214 is associated with version 1.3 of the service application, while the incremental version data 216 is associated with version 1.0 of the service application. The above tags also illustrate how information may be updated from a first version (identified using a set of tags in the base version data 214) to a second version (identified using the same set of tags in the incremental version data 216). By correlating data identified by a set of tags in the base version data 214 with data identified by the same set of tags in the incremental version data 216, the merged version data 218 may be created.

For illustration purposes, a sample portion of merged version data 218, based on the base version data 214 of Example 1 and the incremental version data 216 of Example 2, is provided below in Example 3. As Example 3 illustrates, the information encapsulated by the <VersionedClass> XML tag, in the merged version data 218, has been updated based on the revised information contained in the incremental version data 216.

Example 3

```
<?xml version="1.0" encoding="UTF-8"?>
<Component Name="IFCOMMON" ComponentVersionID="0">
    <VersionInfo>
        <VersionedClass>
            XPath="/InterfaceAllConfiguration"
            MajorVersion="1"
            MinorVersion="0"
        </VersionedClass>
    </VersionInfo>
    <Record Name="IFGeneralRecord"
        DBTableName="HFR_COMMON_INTERFACE_CONFIG"
        CommonPath="/InterfaceAllConfiguration/InterfaceConfiguration"
        Type="Vector">
        <Property Name="InterfaceName"
            DBColumnName="IFID"
            XPath="/InterfaceAllConfiguration/InterfaceConfiguration/
            Naming/name"
            RelativePath="/Naming/name"
            Type="String"
            DisplayName="InterfaceName"
            Key="true"
            Required="true"
            Visible="true"
            Serializable="true"/>
        <Property Name="IPMTU"
            DBColumnName="IFMTU"
            XPath="/InterfaceAllConfiguration/InterfaceConfiguration/
            MTU"
            RelativePath="MTU"
            Type="UnsignedInt"
            DisplayName="MTU (Layer 3)"
            Required="false"
            MinValue="68"
            MaxValue="65535"
            Visible="true"
            Serializable="true"/>
        <Property
            Name="OldField"
            DBColumnName="OLDFIELD"
            XPath="/InterfaceAllConfiguration/InterfaceConfiguration/
            OldField"
            RelativePath="OldField"
            Type=UnsignedInt32
            DisplayName="OldField"
            Required="true"
            Serializable="true"/>
    </Record>
</Component>
```

The merged version data 218 of Example 3 illustrates a portion of the data model of version 1.0 of the service application, while the base version data 214 of Example 1 illustrates a portion of the data model of version 1.3 of the service application. As shown above in Example 3, in an embodiment, merged version data 218 may be expressed using the XML protocol.

In an embodiment, version engine 212 only creates merged version data 218 once. For example, version engine 212 may create merged version data 218 for a new version of a service application in response to (a) when the EMS server 210 receives incremental version data for the new version, or (b) the first time that the EMS server 210 receives a request from an EMS client to provision a service on a particular network element using the new version of the service application. After the version engine 212 creates the merged version data 218, the version engine 212 may store the merged version data 218 so that subsequent requests involving the new version may be processed without overlaying the incremental version data 216 on the base version data 214 to create the merged version data 218.

Once the merged version data 218 is created for a particular version of a particular service application (e.g., version 3.4 of service application A), anytime that the EMS server 210 receives a request to provision a service using on a network element using that particular version of that particular service application (e.g., version 3.4 of service application A), the EMS server 210 may use the merged version data 218 associated with particular version of the particular service application. Thus, merged version data 218 may be created and stored for any version of any service application supported by the EMS server 210.

After merged version data 218 is created, processing proceeds to step 320.

In step 320, a version identifier for a network element is mapped to a copy of the merged version data. The motivation of performing step 320 is to enable the EMS server 210 to determine, which network elements are executing a version of a service application associated with a set of merged version data 218 stored at the EMS server 210. Thus, in step 320, the version engine 212 may store, for each set of merged version data 218 maintained by the version engine 212, a set of one or more version identifiers that identify which network elements are executing a version of a service application associated with each set of merged version data 218. After the performance of step 320, processing proceeds to step 322.

In step 322, a configuration for a network element is created. The purpose of step 322 is for the EMS server 210 to maintain data that identifies all versions of all service applications on each network element managed by the EMS server 210. In this way, when the EMS server 210 receives a request to provision a service on a network element, the EMS server 210 can determine which versions of which applications are installed on the network element. Further, using the mapped version identifier of step 320, the EMS server 210 can determine which sets of merged version data 218 are associated with the versions of service applications installed on the network element. In this way, the EMS server 210 can determine the data model of a service application for use in responding to a provisioning request on a particular network element.

The performance of steps 320 and 322 may be performed in a different order than that depicted in FIG. 3. For example, step 322 may be performed when a network element registered with EMS server 210, and thus, may be performed prior to the performance of step 310. Thus, sequence of steps depicted in FIG. 3 are merely illustrative, as other embodiments perform the steps of FIG. 3 in a different order.

Storing Multiple Sets of Merged Version Data

In an embodiment, EMS server 210 may store one or more sets of base version data 214(1)-(n), and each set of base version data 214(1)-(n) may be associated with a different service application. Using the one or more sets of base version data 214(1)-(n), the EMS server 210 may retrieve one or more sets of incremental version data 216(1)-(n) to create one or more sets of merged version data 218. For example, version engine 212 may create and store multiple sets of merged version data 218(1)-218(n), where each set of the merged version data 218(1)-218(n) is associated with a different version of the service application. For example, base version data 214 may be associated with version 2.0 of a service application, merged version data 218(1) may be associated with version 1.0 of the service application, and merged version data 218(2) may be associated with version 3.0 of the service application. In this way, the EMS server 210 may support version 1.0, 2.0, and 3.0 of the service application using either base version data 214 or merged version data 218(1) or 218(2).

In addition, the EMS server 210 may store sets of merged version data 218 for different service applications supported by the EMS server 210. For example, base version data 214(1) may be associated with version 1.0 of service application A, while base version data 214(2) may be associated with version 1.0 of service application B. Incremental version data 216 may be obtained for different versions of service application A and for different versions of service application B. As a result, merged version data 218 may be created and stored for any number of service applications, and for any number of versions of a particular service application.

Informing the EMS Server and the EMS Client of Version Information

In an embodiment, when an administrator wishes to manage a new network element using EMS server 210, the administrator will use EMS client 220 to communicate with the EMS server 210 to add the new network element to the list of network elements managed by the EMS server 210. This process may require the EMS server 210 to collect some information from the network element. For example, the EMS server 210 may collect information about all the versions of service applications executed by the network element. The EMS server 210 may then store this information for future use.

If the EMS server 210 determines that the network element is executing a version of a service application ("an unknown version") for which the EMS server 210 is not storing either (a) base version data 214 or (b) merged version data 218, then the EMS server 210 may determine whether the EMS server 210 is storing incremental version data 216 associated with the unknown version, and if so, generate and store merged version data 218 for the unknown version as described above. Alternately, if the EMS server 210 is not storing incremental version data 216 associated with the unknown version, then the EMS server 210 may try to obtain incremental version data 216 from incremental version source 230, and thereafter generate and store merged version data 218 for the unknown version as described above.

In an embodiment, when an administrator uses EMS client 220 to communicate with the EMS server 210 to provision a service on network element 240, EMS client 220 initially communicates with EMS server 210 to obtain a list of the network elements that are managed by the EMS server 210. Thereafter, EMS client 220 provides a graphical user interface (GUI) to the administrator that allows the administrator to select a particular network element (such as network element 240), from the list of network elements managed by the EMS server 210, which the administrator wishes to configure. After the administrator makes his or her selection, EMS client 220 transfers data that indicates the selection to EMS server 210. The EMS server 210 responds by transmitting to EMS client 220 a list of all the service applications executing on network element 240.

Once the administrator makes a selection of which service application that the administrator wishes to configure, EMS client 220 may transmit the selection to the EMS server 210. After receiving the selection, the EMS server 210 may transmit, to EMS client 220, information about the data model of the version of the selected service application executing on the selected network element that the administrator wishes to configure. In this way, the EMS client 220 is informed of the new data model of the new version of the service application.

Dynamic Adjustment of an EMS Client GUI

While embodiments of the invention advantageously allow EMS server 210 to support new versions of a service application without upgrading the EMS server software, it is noted that the graphical user interface (GUI) of EMS client 220 would still need to be upgraded to reflect the new version of a service application being supported by the EMS server 210. This is so because the GUI of the EMS client 220 is typically designed for use with the version of the service application associated with the base version data 214, which is usually the most recent version available when the EMS server software is installed on the EMS server 210. However, as indicated above, the EMS client 220 may be used to configure versions of service applications other than those the EMS client 220 was designed to be used. As described below, various embodiments of the invention may address this situation using different approaches.

According to one embodiment, if the GUI of EMS client 220 does not reflect the data model of a selected version of a selected service application that an administrator wishes to configure, the EMS client GUI may disable any data fields that the GUI cannot handle. For example, assume that the EMS client GUI is designed to work with version 2.0 of a service application, but in version 3.0, several attributes have been removed from the data model. If the administrator attempts to use that GUI to configure version 3.0 of the server portion of service application that is executing on the EMS server 210, then the data fields corresponding to removed attributes may be disabled. Disabled data fields are typically shown grayed out, and do not permit the administrator to perform any modifications using the disabled data fields.

According to another embodiment, the EMS client 220 may dynamically construct a GUI based on the information sent from the EMS server 210 to the EMS client 220. In this way, if attributes have been added to a data model, then the EMS client 220 may be able to dynamically generate a GUI to that displays data fields associated with the added attributes to allow their configuration. Similarly, the GUI may be dynamically generated such that it does not display data fields associated with attributes that have been removed from a data model.

For example, the EMS server 210 may transmit to the EMS client 220 information about the data model of the version of the service application that the administrator wishes to configure. The EMS client 220 may use the information about the attributes of the data model to dynamically generate a GUI that may be used to configure the server portion of the service application executing on the EMS server 210.

For example, the EMS server 210 may send, to the EMS client 220, the merged version data 218 associated with the selected version of the service application. In an embodiment, incremental version data 216 may contain certain XML tags that indicate which screen of a GUI, used by EMS client 220, that data fields, associated with attributes of the data model, should appear. For example, attributes of the data model may be associated with an XML tag that identifies how the data fields associated with these attributes should appear on the GUI, e.g., the data fields should appear on the same page or in a table having a certain dimension.

In this way, the EMS client 220 may dynamically generate a screen of a GUI by displaying a set of data fields that are associated with attributes identified by one or more XML tags. To illustrate, if a new version of a service applications adds 10 new data items, then these new data items may be shown on the same screen by associating those 10 data items with a XML tag in the incremental version data 216.

When incremental version data 216 is created, information about how to display the changed attributes at the GUI of the EMS client 210 may be stored therein. The merged version data 218 will contain the new tags containing such information after the version engine 212 overlays the incremental version data 216 with the base version data 214. Thus, when the EMS server 210 transmits the merged version data 218 to the EMS client 220, the EMS client 220 will be able to use that information to dynamically generate a GUI to show the new data items in a manner that makes more visual sense to the administrator.

Implementing Mechanisms

Figure 4:
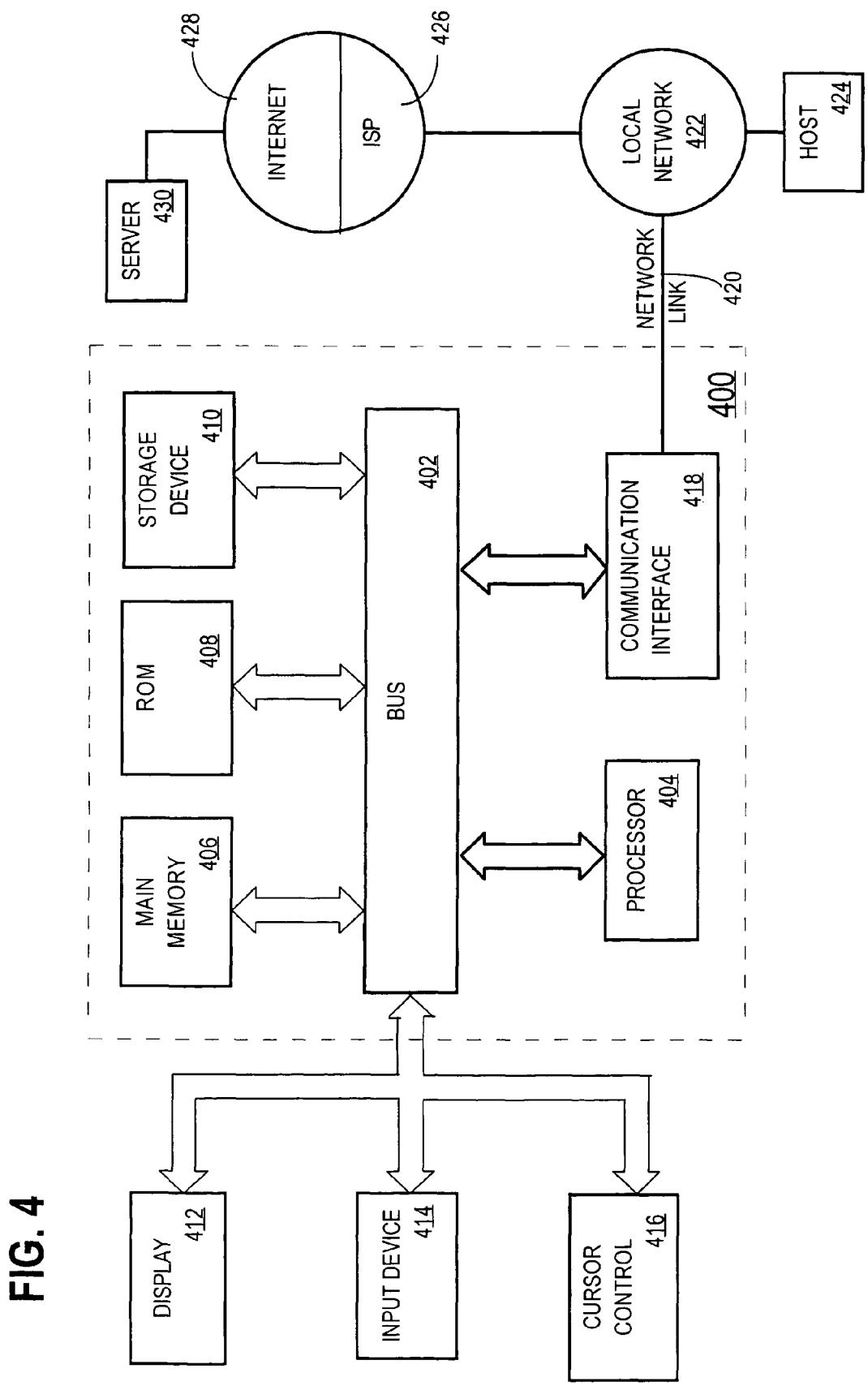
FIG. 4 is a block diagram that illustrates a computer system upon which an embodiment may be implemented.

In an embodiment, an EMS client, an EMS server, an incremental version source, and a network element may be implemented using a computer system. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for configuring a device, comprising the steps of:
    storing, at a server, base version data that describes a first data model, wherein the first data model is for a first version of a software application hosted on a network element;
    using, by server software on the server, the base version data to communicate with the first version of the software application to provision a service on the network element;
    receiving, at the server, incremental version data that describes changes between the first data model and a second data model for a second version of the software application;
    correlating, at the server, the incremental version data with the base version data; and at least initially, overlaying the incremental version data with the base version data to form merged version data that describes the second data model; and
    without upgrading the server software on the server, using, by the server software on the server, the merged version data to communicate with the second version of the software application to provision a new service on the network element;
    wherein the method is performed by one or more computing devices.

2. The method of claim 1, wherein the step of correlating the incremental version data with the base version data is performed in response to receiving a request to perform an operation involving the second version of the software application on a particular network element.

3. The method of claim 2, further comprising:
    identifying which version of the software application is installed on the particular network element referenced by the request; and
    identifying a particular set of incremental version data, among a plurality of sets of incremental version data stored at the server, that is associated with the particular network element referenced by the request.

4. The method of claim 1, further comprising:
    storing the merged version data; and
    in response to receiving a request to perform an operation involving the second version of the software application on a particular network element, retrieving the merged version data.

5. The method of claim 1, wherein the incremental version data contains information for use by a client to dynamically generate a GUI for use in configuring how to provision the new service on the network element using the second version of the software application.

6. The method of claim 1, wherein the merged version data, the incremental version data, and the merged version data are expressed using an XML schema.

7. A machine-readable volatile or non-volatile storage medium storing one or more sequences of instructions for configuring a device, wherein execution of the one or more sequences of instructions by one or more processors causes the one or more processors to perform the steps of:
    storing, at a server, base version data that describes a first data model, wherein the first data model is for a first version of a software application hosted on a network element;

using, by server software on the server, the base version data to communicate with the first version of the software application to provision a service on the network element;

receiving, at the server, incremental version data that describes changes between the first data model and a second data model for a second version of the software application;

correlating, at the server, the incremental version data with the base version data; and at least initially, overlaying the incremental version data with the base version data to form merged version data that describes the second data model; and without upgrading the server software on the server, using, by the server software on the server, the merged version data to communicate with the second version of the software application to provision a new service on the network element.

8. The machine-readable medium of claim 7, wherein the step of correlating the incremental version data with the base version data is performed in response to receiving a request to perform an operation involving the second version of the software application on a particular network element.

9. The machine-readable medium of claim 8, wherein execution of the one or more sequences of instructions by the one or more processors causes the one or more processors to perform the steps of:

identifying which version of the software application is installed on the particular network element referenced by the request; and identifying a particular set of incremental version data, among a plurality of sets of incremental version data stored at the server, that is associated with the particular network element referenced by the request.

10. The machine-readable medium of claim 7, wherein execution of the one or more sequences of instructions by the one or more processors causes the one or more processors to perform the steps of:

storing the merged version data; and in response to receiving a request to perform an operation involving the second version of the software application on a particular network element; retrieving the merged version data.

11. The machine-readable medium of claim 7, wherein the incremental version data contains information for use by a client to dynamically generate a GUI for use in configuring how to provision the new service on the network element using the second version of the software application.

12. The machine-readable medium of claim 7, wherein the merged version data, the incremental version data, and the merged version data are expressed using an XML schema.

13. An apparatus for configuring a device, comprising:

one or more processors; and a machine-readable volatile or non-volatile medium carrying one or more sequences of instructions for configuring a device, wherein execution of the one or more sequences of instructions by one or more processors causes the one or more processors to perform the steps of:

storing, at a server, base version data that describes a first data model, wherein the first data model is for a first version of a software application hosted on a network element;

using, by server software on the server, the base version data to communicate with the first version of the software application to provision a service on the network element;

receiving, at the server, incremental version data that describes changes between the first data model and a second data model for a second version of the software application;

correlating, at the server, the incremental version data with the base version data; and at least initially, overlaying the incremental version data with the base version data to form merged version data that describes the second data model; and without upgrading the server software on the server, using, by the server software on the server, the merged version data to communicate with the second version of the software application to provision a new service on the network element.

14. The apparatus of claim 13, wherein the step of correlating the incremental version data with the base version data is performed in response to receiving a request to perform an operation involving the second version of the software application on a particular network element.

15. The apparatus of claim 14, wherein execution of the one or more sequences of instructions by the one or more processors causes the one or more processors to perform the steps of:

identifying which version of the software application is installed on the particular network element referenced by the request; and identifying a particular set of incremental version data, among a plurality of sets of incremental version data stored at the server, that is associated with the particular network element referenced by the request.

16. The apparatus of claim 13, wherein execution of the one or more sequences of instructions by the one or more processors causes the one or more processors to perform the steps of:

storing the merged version data; and in response to receiving a request to perform an operation involving the second version of the software application on a particular network element; retrieving the merged version data.

17. The apparatus of claim 13, wherein the incremental version data contains information for use by a client to dynamically generate a GUI for use in configuring how to application.

18. The apparatus of claim 13, wherein the merged version data, the incremental version data, and the merged version data are expressed using an XML schema.

* * * * *